United States Patent [19]

Hwang

[11] Patent Number: 5,251,465
[45] Date of Patent: Oct. 12, 1993

[54] ANTI-THEFT DEVICE FOR AUTOMOBILES

[76] Inventor: Ying-Teh Hwang, No. 220, Ruey Feng Street, Kaohsiung, Taiwan

[21] Appl. No.: 895,035

[22] Filed: Jun. 8, 1992

[51] Int. Cl.$^5$ .............................................. B60R 25/02
[52] U.S. Cl. ...................................... 70/209; 70/226; 70/238; 70/261
[58] Field of Search ................ 70/30, 63, 203, 261, 70/209, 226, 237, 238, 16, 211, 212, 225; 297/379

[56] References Cited

U.S. PATENT DOCUMENTS

| | | | |
|---|---|---|---|
| 1,452,240 | 4/1923 | Hamon | 70/211 |
| 3,348,391 | 10/1967 | Barnwell | 70/211 |
| 4,651,544 | 3/1987 | Hungerford | 70/279 X |
| 5,028,867 | 7/1991 | Smith | 70/261 X |

FOREIGN PATENT DOCUMENTS

| | | | |
|---|---|---|---|
| 513332 | 11/1930 | Fed. Rep. of Germany | 70/211 |
| 2138984 | 2/1973 | Fed. Rep. of Germany | 70/211 |
| 2735782 | 11/1978 | Fed. Rep. of Germany | 70/238 |
| 2618741 | 2/1989 | France | 70/237 |
| 0120548 | 7/1984 | Japan | 70/237 |
| 0247151 | 10/1988 | Japan | 70/237 |
| WO90/09911 | 9/1990 | PCT Int'l Appl. | 70/226 |
| 148683 | 8/1920 | United Kingdom | 70/212 |
| 330475 | 6/1930 | United Kingdom | 70/211 |
| 1269513 | 4/1972 | United Kingdom | 70/238 |
| 2153764 | 8/1985 | United Kingdom | 70/237 |
| 2191981 | 12/1987 | United Kingdom | 70/237 |

*Primary Examiner*—Lloyd A. Gall
*Attorney, Agent, or Firm*—Bacon & Thomas

[57] ABSTRACT

An anti-theft device for coupling a seat back and a steering wheel of an automobile including a lock pivotally coupled to the seat back of the automobile and having a hook pivotally engaged on the lock for engagement on the steering wheel of the automobile, whereby, a person is prevented from quickly sitting on the driver seat of the automobile.

5 Claims, 5 Drawing Sheets

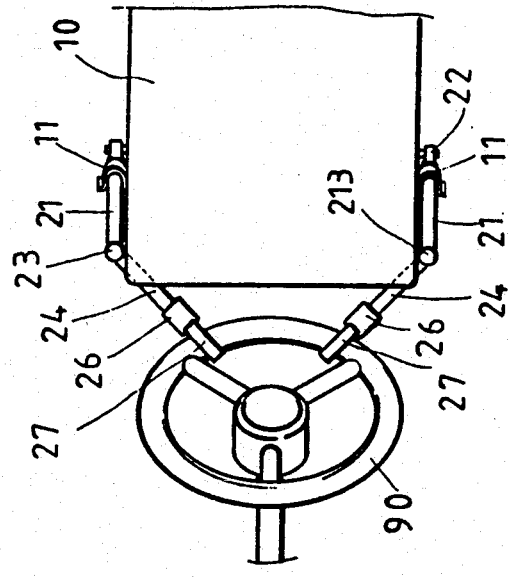
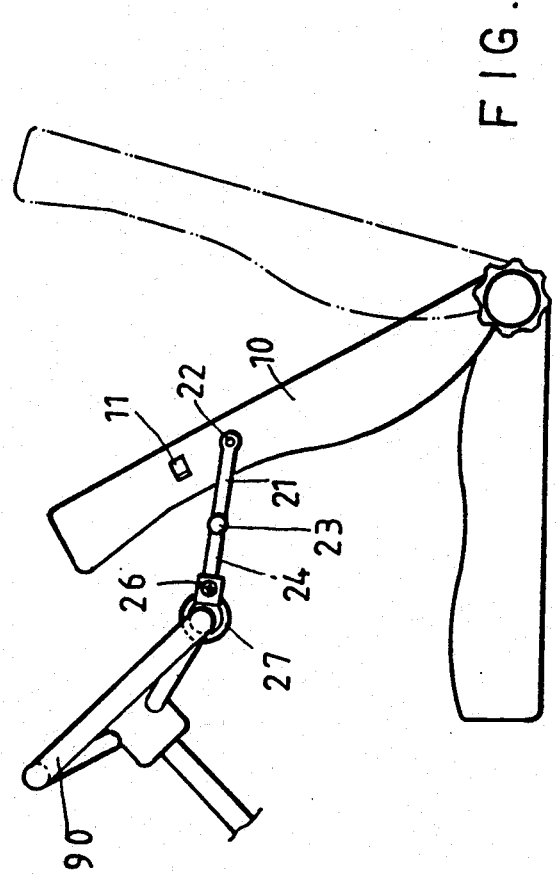

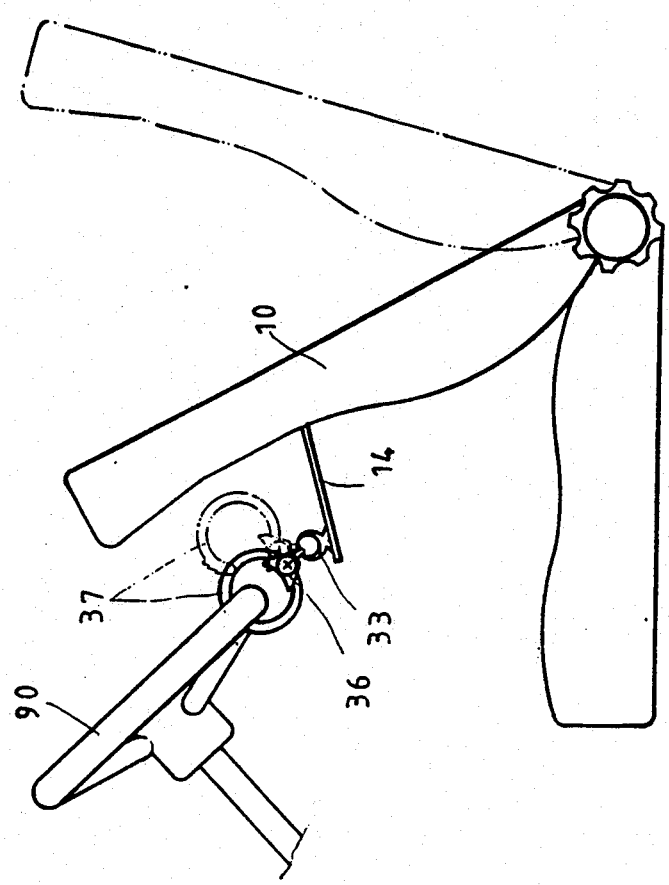
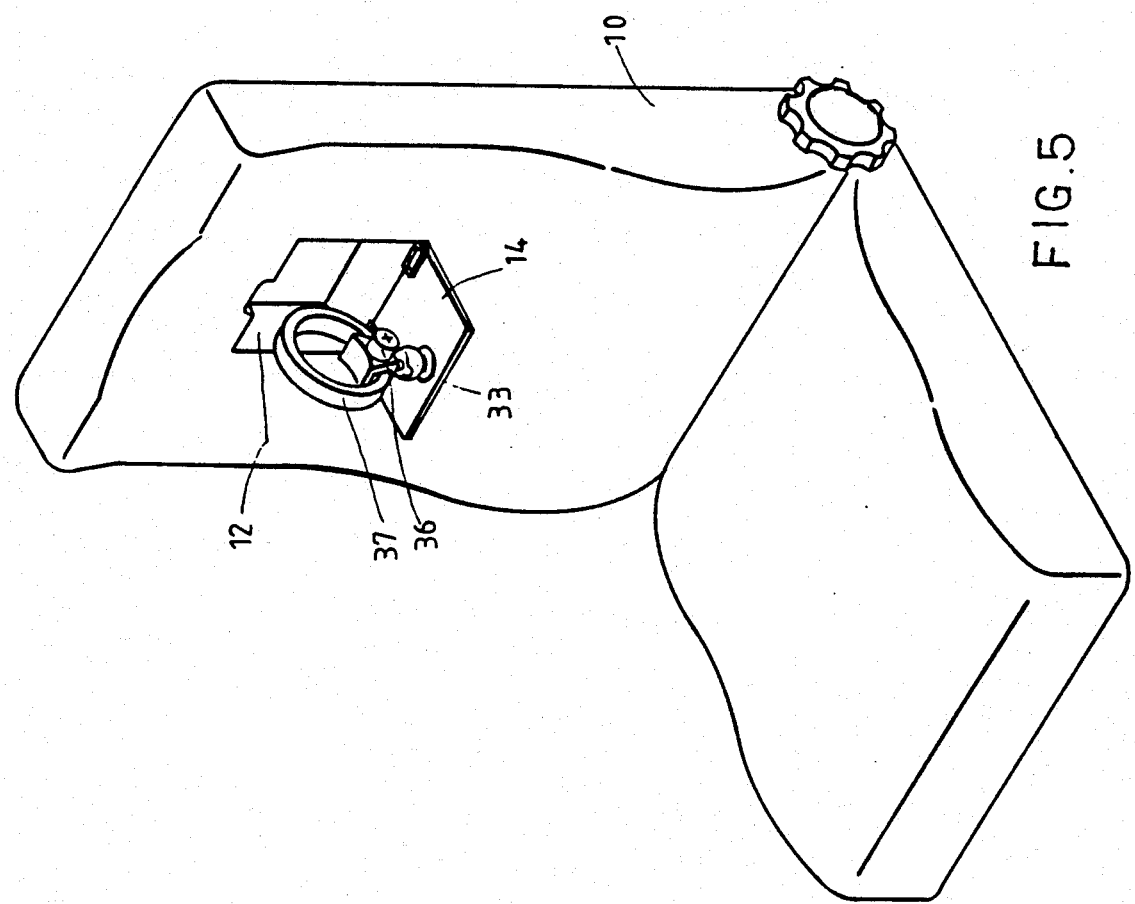

ANTI-THEFT DEVICE FOR AUTOMOBILES

BACKGROUND OF THE INVENTION (a) Field of the Invention

The present invention relates to an anti-theft device, and more particularly to an anti-theft device for automobiles.

(b) Description of the Prior Art

Various kinds of anti-theft devices are provided in automobiles for preventing the movement of the automobiles; generally the anti-theft devices are provided for locking the gear shift, the brake lever and/or the steering wheel. However, once the door of the automobile is opened by a thief, the thief can sit on the driver seat and unlock the lock device. The passers-by may not know that the person seated on the driver seat is the owner of the automobile or a thief.

The present invention has arisen to mitigate and/or obviate the afore-described disadvantages of the conventional anti-theft devices of automobiles.

SUMMARY OF THE INVENTION

The primary objective of the present invention is to provide an anti-theft device for preventing the movement of the automobile and preventing a thief from quickly seating on the driver seat.

In accordance with one aspect of the present invention, there is provided an anti-theft device for coupling a seat back and a steering wheel of an automobile comprising a lock pivotally coupled to the seat back of the automobile and including a hook pivotally engaged thereon for engagement on the steering wheel of the automobile, whereby, a person is prevented from quickly sitting on the driver seat of the automobile.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 3 is a side view illustrating the operations of the anti-theft device;

FIG. 4 is a top view illustrating the operations of the anti-theft device;

FIG. 5 is a perspective view illustrating a second embodiment of the present invention;

FIG. 6 is a side view illustrating the operations of the anti-theft device of FIG. 5;

DETAILED DESCRIPTION OF THE INVENTION

Figure 2:
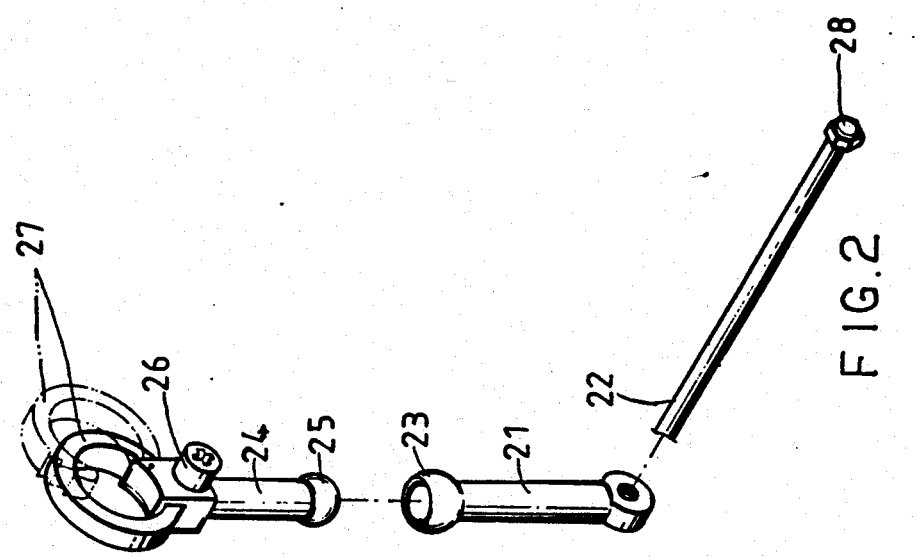
FIG. 2 is an exploded view of the anti-theft device.
Figure 1:
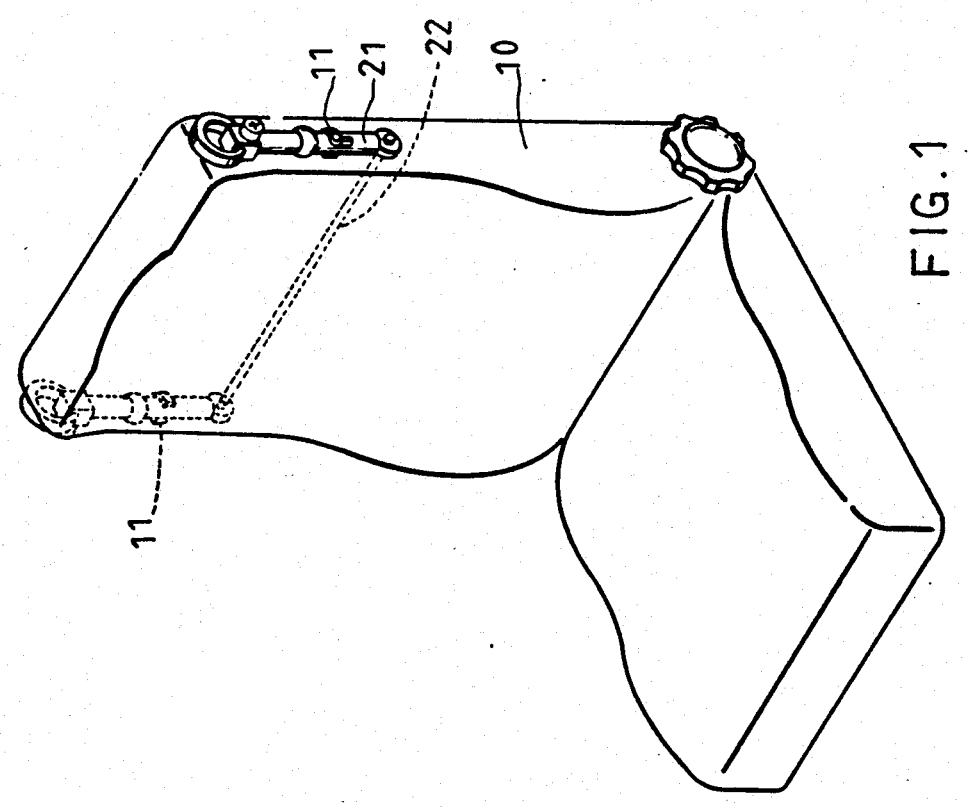
FIG. 1 is a perspective view of an anti-theft device in accordance with the present invention, which is disposed on the seat back of an automobile.

Referring to the drawings and initially to FIGS. 1 and 2, an anti-theft device in accordance with the present invention is generally disposed on the seat back 10 of an automobile which includes two side portions each having a retainer 11 disposed thereon, the anti-theft device comprises generally a pair of arms 21 having a lower end pivotally coupled together by a rod 22 and each having a socket 23 formed integral on the upper end thereof and arranged such that the arms 21 are rotatable about the rod 22; and a pole 24 having a ball 25 formed integral on the lower end thereof for engagement with the socket 23 so as to form a ball and socket coupling such that the pole 24 is freely rotatable about the socket 23, and having a lock 26 engaged on the upper end thereof, the lock 26 includes a lock hook 27 engaged thereon and opened and closed by the lock 26, in a conventional way. The rod 22 extends laterally through the seat back 10 and a nut 28 is engaged on each of the end portions of the rod 22 and is preferably solidly fixed to the rod 22, such as by welding, so that the arms 21 can not be easily disengaged from the rod 22.

As shown in FIG. 1, the arms 21 are retained in place, by force-fitted engagement, by the retainers 11 such that the arms 21 are retained in an upright position, i.e., a rest position, and such that the arms 21 contact the side portions of the seat back 10 respectively, accordingly, the anti-theft device will not affect the operation of the drivers. The arms 21 can be easily disengaged from the retainers 11 by pulling the arms 21 forward of the retainers 11.

In operation, referring next to FIGS. 3 and 4, the lock hooks 27 are engaged on the steering wheel 90. It is to be noted that the seat back 10 is preferably moved forward, and the side portions of the seat back 10 is obstructed by the anti-theft device of the present invention, such that the thief can not set on the driver seat until the anti-theft device is unlocked. Accordingly, the thief can not quickly set on the driver seat.

It is to be noted that, instead of two sets of the arms 21 and poles 24, only one set, which is disposed on the left side of the seat back 10, is sufficient for achieving the same purposes; in which, the lower end of the arm 21 is pivotally coupled to the left side of the seat back 10 by a bolt and nut.

Figure 7:
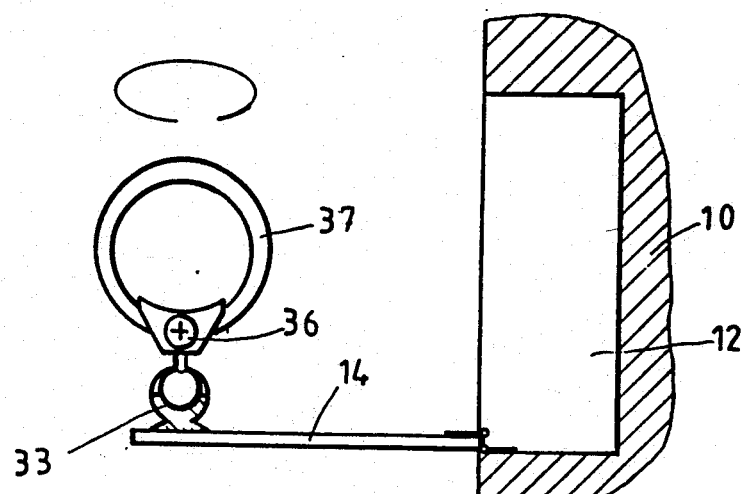
FIGS. 7, 8 and 9 are partial cross sectional views illustrating the operations of the anti-theft device.
Figure 8:
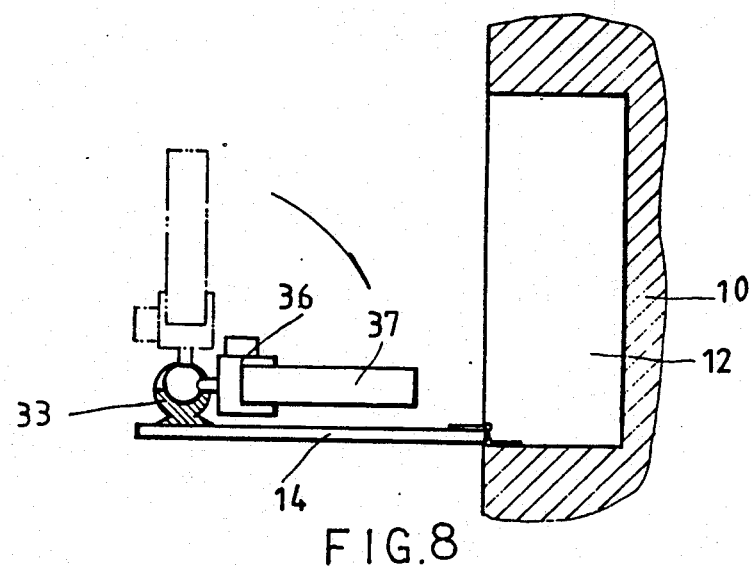
Figure 9:
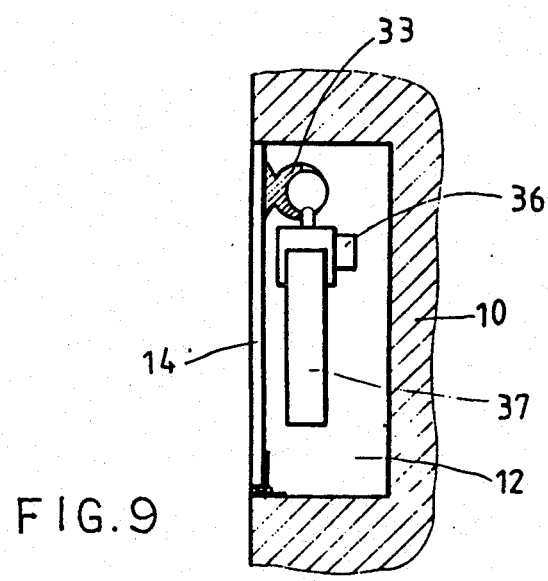

Referring next to FIGS. 5 to 9, illustrated is a second embodiment of the present invention; in this embodiment, a recess 12 is formed in the seat back 10 and is enclosed by a cover 14 which is pivotally coupled to the seat back 10; a lock 36 is coupled to the cover 14 by a ball and socket coupling 33 which is fixed on the cover 14, preferably on the free edge of the cover 14, best shown in FIG. 6; the lock 36 includes a lock hook 37 for engaging onto the steering wheel 90. As shown in FIGS. 7 to 9, the lock 36 and the lock hook 37 are arranged such that they can be received within the recess 12 of the seat back 10. When the lock hook 37 is engaged on the steering wheel 90, the driver seat also can not be easily accessed.

Figure 11:
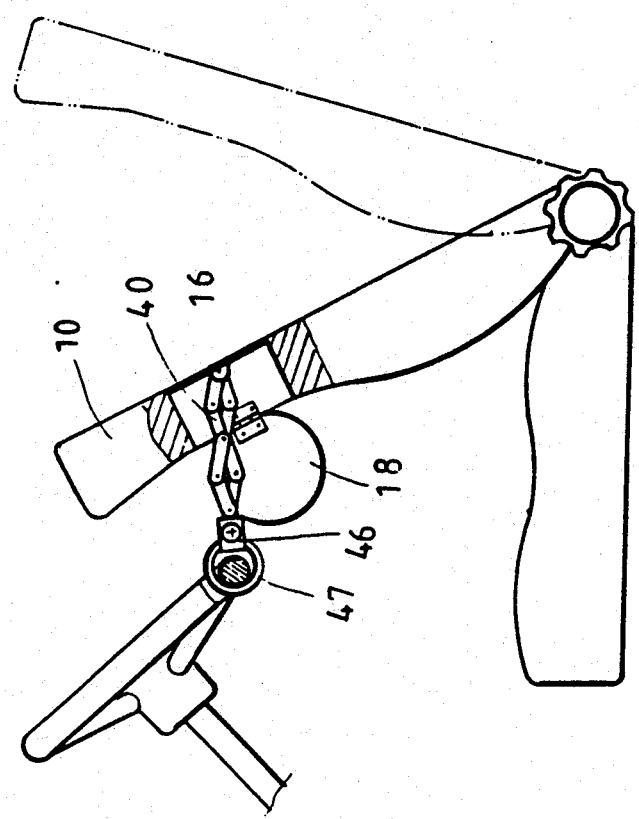
FIG. 11 is a side view illustrating the operations of the anti-theft device.
Figure 10:
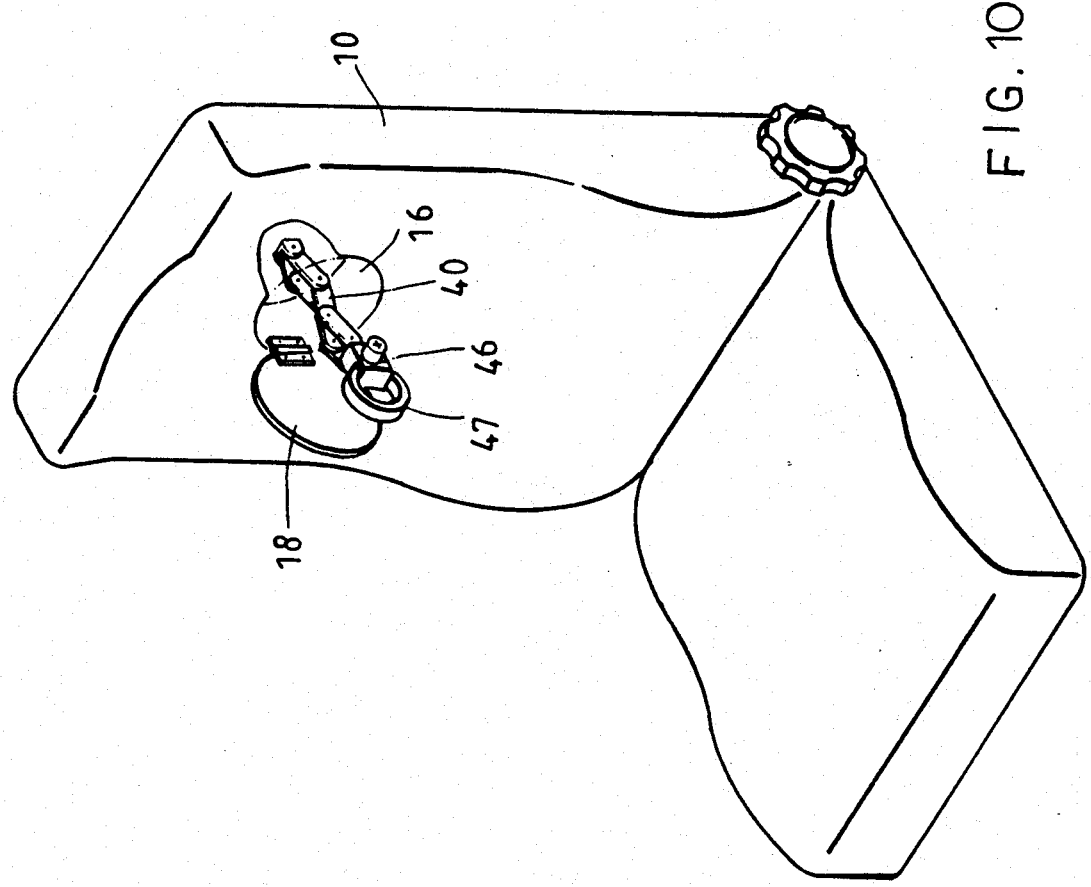
FIG. 10 is a perspective view illustrating a further embodiment of the present invention.

Referring next to FIGS. 10 and 11, illustrated is a further embodiment of the present invention, in which a circular cavity 16 is also formed in the seat back 10 of the vehicle and is enclosed by a cap 18 which is pivotally coupled to the seat back 10. The anti-theft device comprises a lock 46 coupled to the seat back 10 by a lazy tong construction 40 including a plurality of pivotally connected links which can be folded and retracted within the cavity 16 of the seat back 10, and a lock hook 47 engageable onto the steering wheel 90, such that the driver seat also can not be easily accessed.

Accordingly, the anti-theft device in accordance with the present invention prevents the movement of the automobile by preventing a thief from quickly accessing the driver seat.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An anti-theft device for coupling the back of a driver's seat and a steering wheel of an automobile to prevent unauthorized access to the driver's seat, which device comprises:
   a) a rod for extending laterally through a driver's seat back;
   b) a pair of arms, each arm having a first end and a second end, the first ends being coupled together by the rod for pivotal movement of the arms between a position of use and a position of storage, and each second end being provided with a first half of a ball and socket joint;
   c) a pair of locks, each lock including a second half of a ball and socket joint and a hook for detachable engagement with the steering wheel;
   d) the first and second halves of the ball and socket joints being engageable with each other to permit pivotal movement between each lock and each arm; and
   e) whereby when the arms are disposed in the position of use and the hooks are in engagement with the steering wheel, unauthorized access to the driver's seat is prevented.

2. The anti-theft device of claim 1 wherein:
   a) the first half of the ball and socket joint is a socket; and
   b) the second half of the ball and socket joint is a ball.

3. The anti-theft device of claim 1 further including means for retaining each lock and arm to the seat back in the position of storage.

4. An anti-theft device for coupling the back of a driver's seat and a steering wheel of an automobile to prevent unauthorized access to the driver's seat, which device comprises:
   a) an arm having a first end and a second end, the second end being provided with a first half of a ball and socket joint;
   b) means for securing the first end of the arm to a side of a driver's seat back for pivotal movement between a position of use and a position of storage;
   c) a lock including a hook for detachable engagement with the steering wheel and a second half of a ball and socket joint;
   d) the first and second halves of the ball and socket joint being engageable with each other to permit pivotal movement between the arm and the lock; and
   e) whereby when the arm is disposed in the position of use and the hook is in engagement with the steering wheel, unauthorized access to the driver's seat is prevented.

5. The anti-theft device of claim 4 further including means for retaining the lock and arm against the side of the seat in the position of storage, and wherein the first half of the ball and socket joint is a socket and the second half of the ball and socket joint is a ball.

* * * * *